United States Patent [19]

Buehler

[11] Patent Number: 5,425,593
[45] Date of Patent: Jun. 20, 1995

[54] SIGN SUPPORT SYSTEM AND METHOD OF REPAIRING A SIGN SUPPORT MEMBER

[76] Inventor: Richard J. Buehler, 657 Haish Blvd., DeKalb, Ill. 60115

[21] Appl. No.: 111,650

[22] Filed: Aug. 25, 1993

[51] Int. Cl.⁶ .......................... B25G 3/00; E01F 9/00
[52] U.S. Cl. .................................. 403/305; 403/361; 404/9; 404/10; 256/13.1; 14/50
[58] Field of Search ............... 403/305, 300, 379, 361; 256/13.1; 404/9, 10, 11; 14/50

[56] References Cited

U.S. PATENT DOCUMENTS

| | | | |
|---|---|---|---|
| 2,316,890 | 4/1943 | Rockne | 403/305 |
| 3,442,187 | 5/1969 | Hausegger | 404/11 |
| 3,610,288 | 10/1971 | Carr | 403/305 X |
| 3,850,535 | 11/1974 | Howlett et al. | 403/305 |
| 5,090,348 | 2/1992 | Hueron | 404/10 X |
| 5,207,175 | 5/1993 | Andonian | 404/10 X |

FOREIGN PATENT DOCUMENTS

| | | | |
|---|---|---|---|
| 250812 | 4/1964 | Australia | 403/305 |
| 1311931 | 11/1962 | France | 403/305 |
| 2309249 | 8/1974 | Germany | 404/10 |

OTHER PUBLICATIONS

Telespar, a Division of Unistrut Corporation Presents ". . . A New Concept in Sign Support Systems", Catalog No. TEL-101 1973.
Allied Mechanical Tube Division, Qwik-Punch Brochure "The New Direction in Signposts" 1986.

*Primary Examiner*—Edward K. Look
*Assistant Examiner*—Hoang Nguyen
*Attorney, Agent, or Firm*—Wood, Phillips, VanSanten, Clark & Mortimer

[57] ABSTRACT

An apparatus for mounting a sign support member to an existing, elongate first member. The apparatus has a sleeve defining first and second connecting portions, with the first connecting portion having structure for directly engaging the first connecting portion with an existing, elongate first member at least partially one within the other in an operative position. The second connecting portion includes structure for directly engaging the second connecting portion with a sign support member, one at least partially within the other in an operative position.

27 Claims, 5 Drawing Sheets

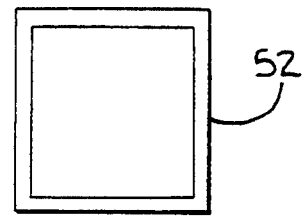
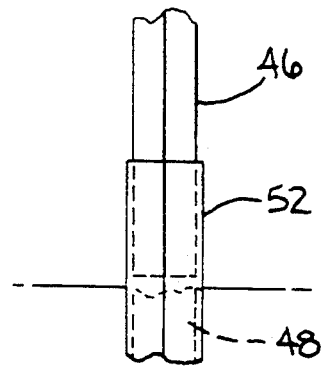
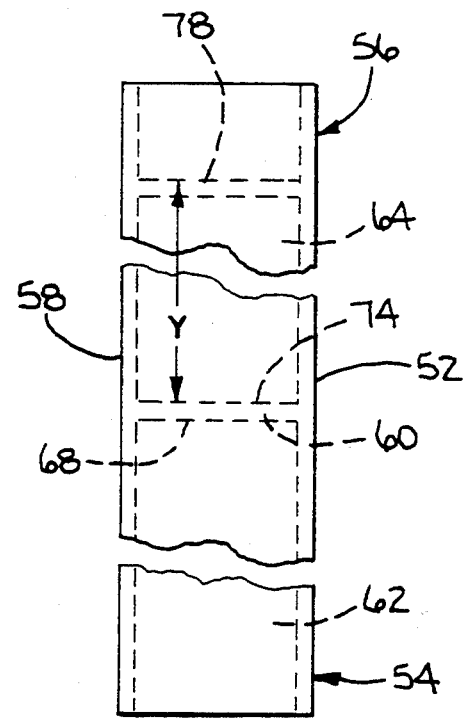
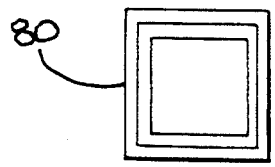
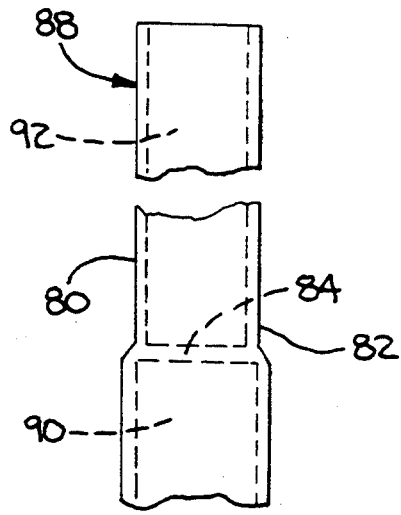

SIGN SUPPORT SYSTEM AND METHOD OF REPAIRING A SIGN SUPPORT MEMBER

BACKGROUND OF THE INVENTION

1. Field Of the Invention

This invention relates to supports for signs, meters, gates, etc. as used along highways and, more particularly, to a sign support system that can be installed and repaired simply and at a relatively low cost. The invention also relates to a method of constructing such a system and effecting repair thereof.

2. Background Art

In 1991, it was estimated that there were in excess of 50 million highway signs in the U.S., to include stop signs, warning signs, speed limit signs, road identification signs, etc. that must be periodically replaced and repaired. In addition to these signs, there are a large number of highway assist structures, such as parking meters, railroad crossing indicators, etc. that require periodic maintenance and replacement, as when struck by a motor vehicle. Mounting of most of the above roadside structures is regulated by the Federal Highway Administration, which places a number of restrictions on the construction thereof.

One such regulation requires that sign posts break off at or below a certain impact force. This regulation is intended to avoid injury to passengers and vehicles due to posts that are too rigid and those that might bend in such a manner to be dangerously oriented upon impact. As a result, a large number of these signs are severed along roadways, often by no more than a relatively minor impact by a vehicle, as at a crossing.

Various types of sign supports are currently available to comply with these regulations. One common form of sign support is a wooden post, on the order of four inches square, which is buried in the ground to effect anchoring thereof. Upon being impacted by a motor vehicle, these posts snap off near ground level.

Repair of such a sign post can be effected in a number of ways. In one manner of repair, an entirely new post is planted at a new location in the vicinity of where the old part was placed. The post portion remaining in the ground can be trimmed at or below ground level to avoid an exposed hazard. This manner of repair is undesirable in that the sign may be repositioned in less than an optimal location.

In another manner of repair, the post portion remaining in the ground can be dug up in what is a relatively difficult and time consuming operation. An entirely new post is then implanted in exactly the same location where the original post was placed.

Regardless of which replacement procedure is followed, the severed post becomes scrap and an entirely new post is substituted. This is undesirable from both an economic and ecological standpoint.

Alternative systems to wood are currently available. One such system is offered by Unistrut Corporation in Wayne, Mich. and employs square, telescoping metal channels that are held together using bolts. This system, which is described in greater detail in the Detailed Description of the Drawings section that follows, uses three different size channels. A mid-size channel is initially driven into the ground. A larger channel is placed over the mid-size channel to project sightly above ground level. A small channel fits within the mid-size channel and projects upwardly to provide a support for the sign, meter, etc. Upon impact, the small channel severs at the top of the large channel where the wall is reinforced by reason of the double thickness thereat.

The problem with replacement of the small channel is similar to that with wooden posts. That is, the small channel that is received within the mid-size channel must be removed, whereupon a full length small channel is used for replacement. Disassembly of the system may be aggravated by corrosion, rusting, and/or foreign matter that migrates through available bolt holes to impede telescoping between the channels. Once the disassembly is carried out, the upper portion of the small channel becomes scrap to be discarded or used for a different purpose. The user is thus faced with the inconvenience of discarding the scrap, with the economic and ecological drawbacks being apparent.

Repair and replacement of the above systems involve an extraordinary amount of waste in terms of man hours, unusable scrap material, etc. This expense must be born by federal, state and local governments alike and is ultimately passed on to the taxpayer.

SUMMARY OF THE INVENTION

The present invention is specifically directed to overcoming the above enumerated problems in a novel and simple manner.

According to the invention, an apparatus is provided for mounting a sign support member to an existing, elongate first member. The apparatus has a sleeve defining first and second connecting portions, with the first connecting portion having structure for directly engaging the first connecting portion with an existing, elongate first member at least partially one within the other in an operative position. The second connecting portion includes structure for directly engaging the second connecting portion with a sign support member, one at least partially within the other in an operative position.

With the inventive structure, in the event of failure of the sign support member, the sign support member can be replaced without having to replace the first member to which the sign support member is mounted. Even more advantageous, the portion of the failed sign support member can be reused in conjunction with the first member. Thus man hours involved in replacement and waste material are minimized.

Structure, in the form of adhesive, screws, bolts, clips, etc., can be used to maintain the engagement of the first and second connecting portions and elongate first member and sign support member, respectively. This engagement can be maintained either permanently or releasably, with the latter facilitating repair.

To facilitate construction, the sleeve can be made so that each of the first and second connecting portions defines a cup-shaped receptacle to slidably accept a free end of the sign support member and an existing elongate first member. One or more walls can be provided to bound the receptacles with oppositely facing surfaces of the wall(s) abutting the free ends of the first member and sign support member to consistently establish the relationship between the sleeve, first member and sign support member.

The sleeve can be made as one piece from metal, plastic, or other suitable material. Alternatively, the sleeve can be constructed with joinable parts to facilitate connection of the sleeve to members having a non-uniform cross section.

The first member and sign support member can be made from any suitable material. Among these materials are wood, plastic, metal, etc.

It is contemplated that the first member be a vertically extending member, such as one embedded in the ground, beneath where a sign is to be displayed on the sign support. However, the inventive concept is useable on horizontally extending members, such as a railroad gate, as to replace part or all of the length thereof.

In the event of repair of a sign post or rail gate, the broken off portion thereof can be reused by connecting it to the sleeve and thereafter connecting the sleeve to the remaining pan of the post or gate, which constitutes the above described first member.

In another form of the invention, an apparatus is provided for mounting a highway sign support to an existing, elongate first member. The apparatus has a sleeve defining first and second connecting portions, with the first connecting portion including structure for directly engaging the first connecting portion with an existing elongate first member rigidly in an operative position. The second connecting portion includes structure for directly engaging the second connecting portion with the sign support member rigidly in an operative position.

Still further, the invention contemplates a method of mounting a sign support member to an existing elongate first member. The method includes the steps of providing a rigidly supported, elongate first member, providing a sign support member, providing a sleeve defining first and second connecting portions, engaging the first connecting portion of the sleeve directly with the first member in an operative position wherein the first connecting portion of the sleeve and first member are rigidly connected, and engaging the second connecting portion of the sleeve directly with the sign support member in an operative position wherein the second connecting portion of the sleeve and sign support member are rigidly connected.

Optionally, the sleeve can be bolted, or otherwise secured to at least one of the first member and sign support member.

With an existing, severed post, the first member constitutes that portion which is buried in the ground. The space around the free end of the first member can be cleared to facilitate sliding of the first connecting portion over the free end of the first member. Alternatively, the sleeve can be driven over the free end of the first member without significant clearing.

Optionally, the free end of the first member can be trimmed before the sleeve is connected thereto.

With the sleeve having a dividing wall therein, each of the first member and sign support member can be abutted to the wall for consistent length formation. Alternatively, the sleeve can be formed in parts which are joinable to capture one or both of the first member and sign support member.

BRIEF DESCRIPTION OF THE DRAWINGS

FIGS. 11-13 show the sequence of repair of an existing sign support post according to the present invention;

FIG. 14 is a side elevation view of a sleeve on a sign support system, according to the present invention;

FIG. 15 is a plan view of the sleeve in FIG. 14;

FIG. 16 is a side elevation view of a modified form of sleeve, according to the present invention;

FIG. 17 is a plan view of the sleeve in FIG. 16;

DETAILED DESCRIPTION OF THE DRAWINGS

Figure 1:
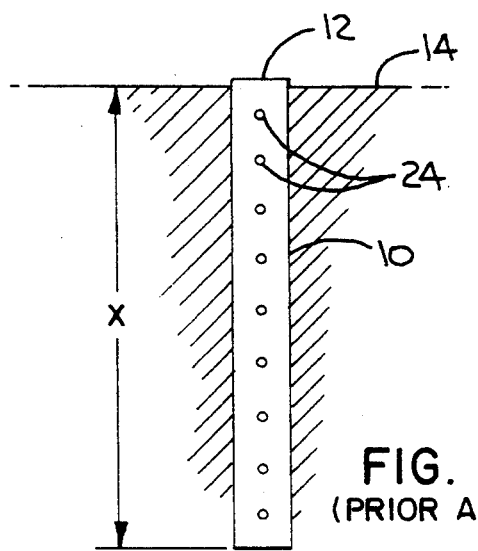
FIGS. 1-5 show the sequence of assembly and replacement of a post on a prior art sign support system.
Figure 2:
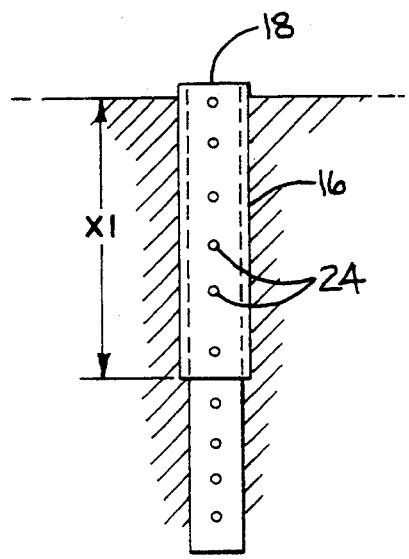
Figure 3:
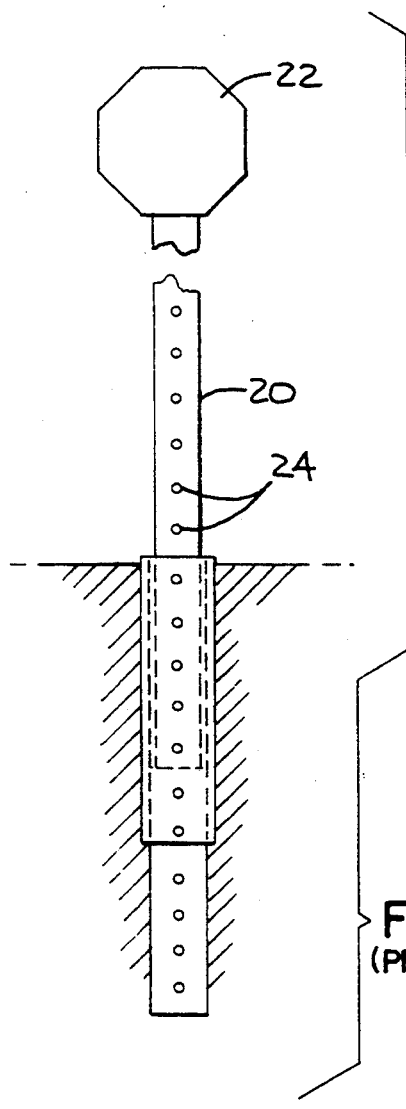

In FIGS. 1-7, different prior art sign support systems are shown to identify the disadvantages thereof that are overcome by the present invention. In FIGS. 1-5, a system currently offered by Unistrut Corporation in Wayne, Mich. is briefly described.

Unistrut Corporation's system, as described herein, uses three different size square, metal channels. A mid-size channel 10, with a length X of approximately three feet, is driven into the ground until the upper end 12 thereof is slightly above ground level 14. A large channel 16 having a length X1 of approximately 1½ feet, is slid over the channel 10 until the upper end 18 thereof is flush with the channel end 12. A small channel 20 is then directed through the mid-size channel 10. The small channel 20 has a length chosen so that a sign 22 thereon is situated at the desired height above ground level 14. Bolts (not shown) can be directed through alignable bores 24 in each of the channels 10, 16, 20 to maintain the desired relative lengthwise positions thereof and thereby fix the overall length.

Figure 4:
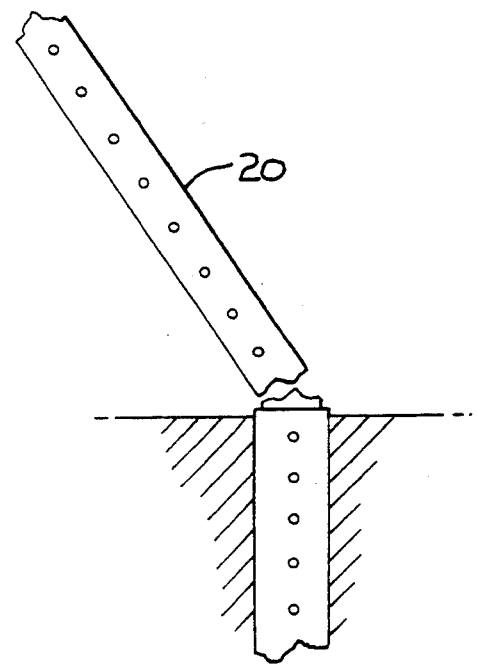

In FIG. 4, the small channel 20 is shown severed, as would occur upon being impacted by a vehicle. The small channel 20 will consistently sever immediately above the upper ends 12, 18 of the mid-size and large channels 10, 16, respectively. Once this occurs, the remaining portion of the small channel 20 within the ground must be removed so that only the mid-size channel 10 and large channel 16 remain in the ground. Removal of the remaining portion of the small channel 20 involves accessing the bolts to effect removal thereof and then sliding the remaining small channel portion 20 from within the mid-size channel 10.

Figure 5:
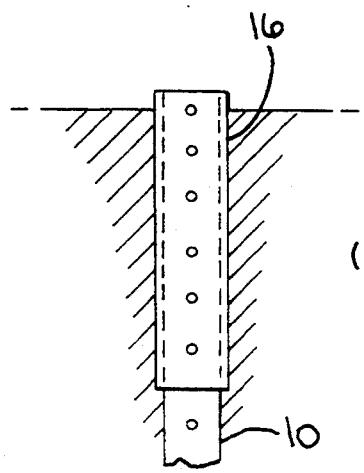

Removal of the small channel 20, as shown in FIG. 5, may be impaired by rust, corrosion, or foreign matter on and between the telescoping channels 10, 16, 20. Grasping of the remaining channel 20 to effect removal is in itself difficult. Once the small channel 20 is severed, it cannot be reused to situate the sign 22 at the same height at which it was originally placed. Consequently, the severed portion of the small channel 20 must either be discarded or salvaged to make a different structure.

Figure 6:
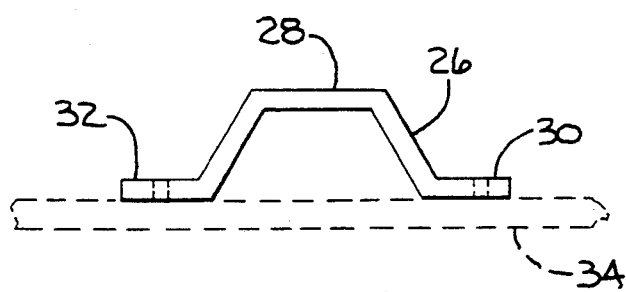
FIG. 6 is a cross-sectional view of a prior art sign support post.

In FIG. 6, another prior art sign post is shown at 26. The sign post 26 has a body 28 that has a formed, U-shaped cross section with outturned legs 30, 32. The sign 34 can be abutted to the legs 30, 32 and appropriately secured, as by bolts (not shown) extending through the sign 34 and into the legs 30, 32. This construction has the drawback that it is prone to twisting and may often assume a dangerous, unsalvageable state upon impact.

Figure 7:
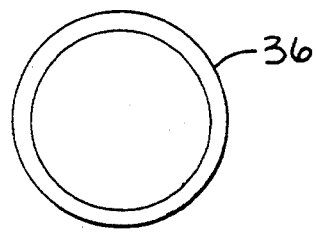
FIG. 7 is a cross-sectional view of an alternative form of prior art sign support post.
Figure 8:
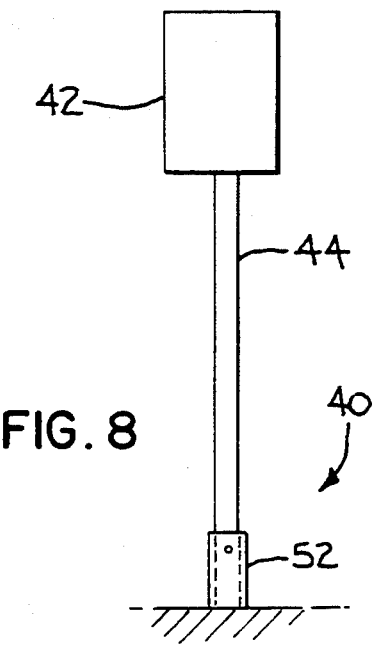
FIG. 8 is a side elevation view of one type of sign that is supported using the present invention.

In FIG. 7, a cylindrical, prior art post 36 is shown for supporting a sign. The post 36 has a number of drawbacks in that it is prone to turning in the ground and does not lend itself to the attachment of signs, or the like, sometimes requiring relatively intricate, separate clamps.

One form of sign support system, according to the present invention, is shown at 40 in FIGS. 8 and 10-15. The system will be described as used to effect a repair, however it should be understood that the same system could be employed to initially set up a sign 42. It should also be understood that while the element 42 is described as a "sign", this is intended to be generic of virtually any structure that is normally mounted upon a post, such as, for example, parking meters.

Figure 11:
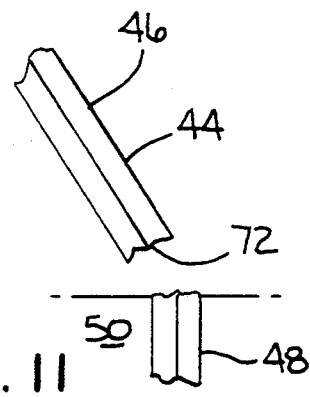

In FIG. 11, a post 44, used to support the sign 42, is shown in a severed state. The post 44 is divided into what will be designated a sign support member 46, which is entirely freed from a separate, elongate first member, which remains embedded in the ground 50.

According to the invention, a sleeve 52 is used to reconnect the sign support member 46 and first member 48. The sleeve 52 has a cross section matched to that of the post 44. In this case, for purposes of illustration, the post 44 is shown to be square. Any other cross-sectional configuration can be used.

The sleeve 52 has a first connecting portion 54 to engage the first member and a second connecting portion 56 to engage the sign support member 48, one within the other. More specifically, the sleeve 52 has a hollow body 58 with a wall 60 dividing the sleeve into first and second, oppositely opening, cup-shaped, internal receptacles 62, 64, respectively.

Figure 12:
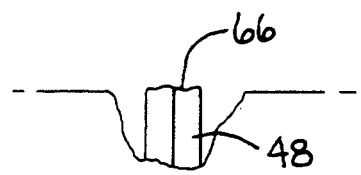

To effect repair of the post 44, the first connecting portion 54 is slid over the free end 66 of the first member 48 until the free end 56 abuts to a downwardly facing surface 68 on the dividing wall 60. This step can be carried out by first clearing away part of the ground around the first member 48, as shown in FIG. 12, or by simply driving the sleeve over the first member 48 to its operative position with the wall surface 68 abutting to the free end 66 of the first member 48. An optional bolt 70 can be used to maintain the connection of the sleeve connecting portion 54 and first member 48.

The sign support member 46 can then be directed into the receptacle 64 until the bottom end 72 thereof abuts to the upwardly facing surface 74 of the dividing wall 60. An optional bolt 76 can also be used to maintain this connection.

The ends 66, 72 can be precisely trimmed to abut the dividing wall 60 to produce a predetermined length. However, the ends 66, 72 need not abut the dividing wail 60, and in fact the dividing wail 60 can be eliminated altogether. With this latter arrangement, the members 46, 48 can be adjusted relative to the sleeve and bolted in place so as to produce the desired overall length for the repaired post 44.

Alternatively, a second dividing wail 78 can be provided in spaced relationship to the dividing wail 60. The bottom end 72 of the member 46 abuts to the upper wail 78. The advantage of this two wail construction is that a substantial portion of one or both of the members 46, 48 can be removed, as by trimming, without altering the overall length of the repaired post 44. That is, the dimension Y in FIG. 14 can be removed from the members 46, 48 without altering the overall height of the repaired post 44.

With the inventive structure, removal of the first member 48 is obviated. Thus, the post 44 can be rebuilt around the existing, elongate, first member 48. At the same time, the sign support member 46 is salvaged, thereby obviating the need to effect disposal thereof. The sign 42 can be placed in the precise location at which it was originally set.

The sleeve 52 can be economically constructed, as from plastic, so that its cost will be considerably less than the materials cost for the replacement of the entire post 44 by conventional methods. The sleeve 52 could of course be made from metal, or other suitable material.

The invention contemplates that the post be constructed of wood, plastic, metal, or other material. The two-part construction allows the use of different materials for the separate members 46, 48. Consequently, one material might be used for the first member 48 that is stronger and has better resistance to corrosion in the ground. The sign support member 46 can be made of material with the desired break away characteristics. Many variations of the above structure are contemplated by the invention. For example, the bolts 70, 76 can be replaced by an adhesive. The connection between the sleeve 52 and post members 46, 48 can be permanent, or one that permits disassembly.

In FIGS. 16 and 17, a modified form of sleeve 80 is shown. The sleeve 80 has a stepped body 82 with a dividing wall 84 and first and second connecting portions 86, 88, corresponding to those previously described for the sleeve 52. The stepped construction results in the formation of a larger first receptacle and a smaller second receptacle 92. With this construction, the post part fit in the first receptacle 90 can be larger, to provide a stronger support, while the post part in the upper receptacle 92 can be smaller, to break away, as federal regulations require.

Figure 9:
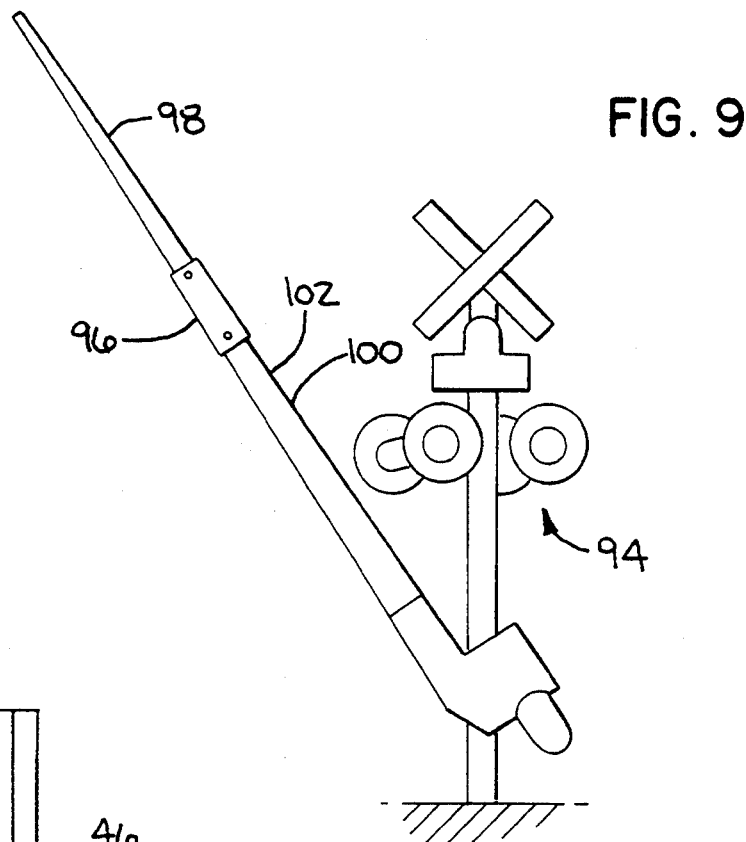
FIG. 9 is a side elevation view of a crossing signal with a gate thereon constructed/repaired according to the present invention.
Figure 10:
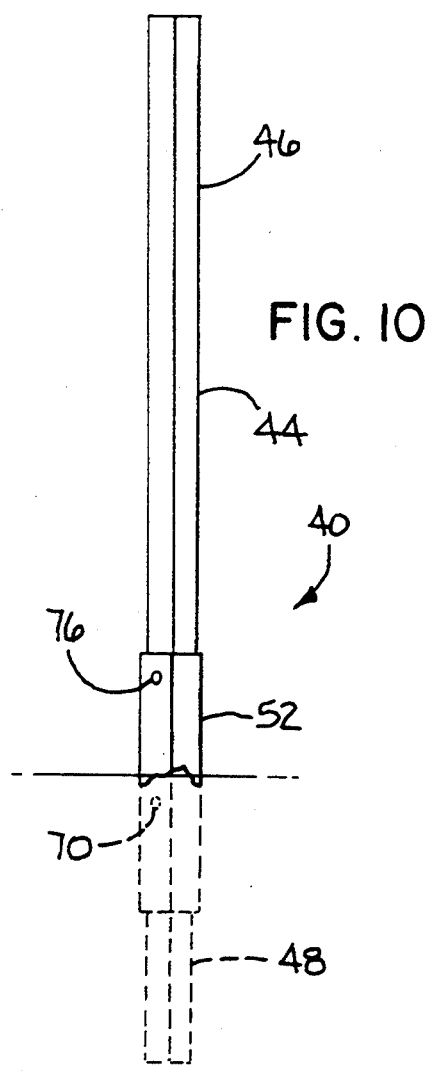
FIG. 10 is a side elevation view of a sign support system according to the present invention.
Figure 18:
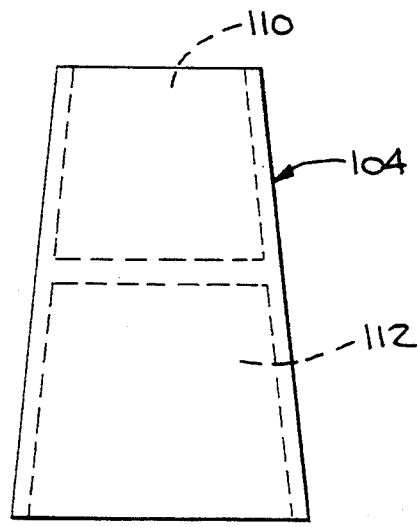
FIG. 18 is an enlarged, side elevation view of a modified form of sleeve, according to the present invention.
Figure 19:
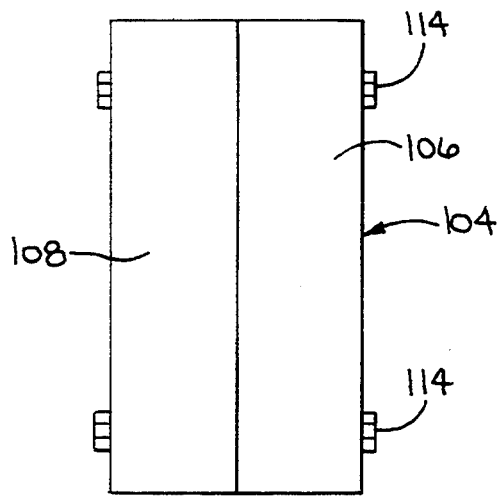
FIG. 19 is a plan view of the sleeve in FIG. 18.

It should be understood that the inventive concept is not limited to vertically extending sign support members that are embedded in the ground. FIG. 9 shows a crossing signal at 94 that is representative of another environment in which the invention can be practiced. In FIG. 9, a sleeve 96, as shown in detail in FIGS. 18 and 19, is used to connect an elongate member 98, corresponding to the sign support member 46, to an existing, first member 100. Commonly, the gate 102, defined cooperatively by the members 98, 100, is broken off by a motorist so as to require replacement of the entire gate 102. With the inventive structure, the gate 102 can be reconstructed using the existing members 98, 100.

According to the invention, a sleeve 104 made of first and second parts 106, 108 is employed in generally the same fashion as the sleeves 52, 80, previously described. In this case, the members 98 have a tapered width which does not permit sliding of the free end of the member 98, 100 into its receptacle 110. The two part construction allows the receptacles 110, 112 to be closely matched to the members 98, 100 and to be captively held between the parts 106, 108, which are held together by bolts 114. This tapered configuration of the receptacle 110 is desirable also because it prohibits withdrawal of the gate member 98 once the sleeve parts 106, 108 are joined.

Figure 20:
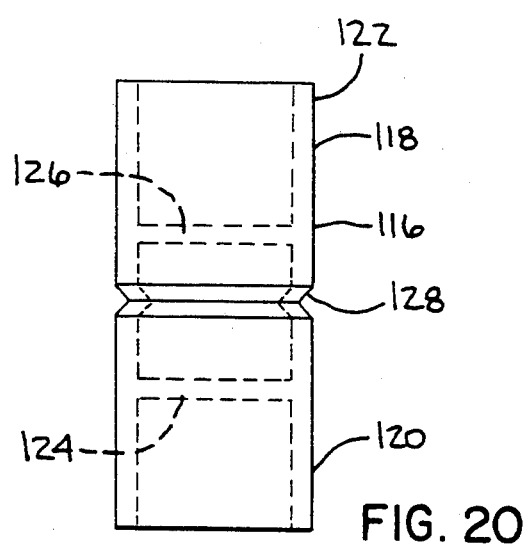
FIG. 20 is a side elevation view of a still further modified form of sleeve, according to the present invention.

A further modified form of sleeve 116 is shown in FIG. 20. The sleeve 116 has a body 118 defining first and second connecting portions 120, 122 and spaced dividing walls 124, 126 to abut parts of a member that are to be joined. Between the walls 124, 126 is a reduced diameter section 128 that weakens the sleeve 118 so that it breaks off consistently under a predetermined force less than that under which the sleeve 118 would break in the absence of the section 128.

With this arrangement, neither of the members engaged with the connecting portions 120, 122 is damaged by reason of the severance of the sleeve 118 at the section 128.

Overall, the invention contemplates a novel and simple manner of installing and replacing a wide variety of vertical and horizontal support posts, gates, or the like. The inventive system is efficient from both a materials and labor standpoint. Materials can be used until their life is naturally exhausted.

The foregoing disclosure of specific embodiments is intended to be illustrative of the broad concepts comprehended by the invention.

I claim:

1. A system for mounting a sign support member to an existing, elongate first member, said system comprising:
   an elongate sign support member; and
   a sleeve defining first and second connecting portions;
   said first connecting portion including means for directly engaging the first connecting portion with the existing elongate first member one at least partially within the other in an operative position so that the sleeve is stably supported on the existing, elongate first member,
   said second connecting portion including means for directly engaging the second connecting portion with the sign support member one at least partially within the other in an operative position so that the means for directly engaging the second connecting portion with the sign support member stably supports the sign support member with the length of the sign support member aligned with the length of the existing, elongate first member to which the sign support member is mounted,
   whereby in the event a sign support member that is mounted is token off so that a pan thereof remains, the sign support member can be mounted to the part of the sign support member that remains and comprises the existing, elongate first member.

2. The system for mounting a sign support member to an existing, elongate first member according to claim 1 including means for maintaining each of a) the first connecting portion and the existing, elongate first member and b) the second connecting portion and the sign support member in the operative position.

3. The system for mounting a sign support member to an existing, elongate first member according to claim 1 including means for releasably maintaining at least one of a) the first connecting portion and the existing, elongate first member and b) the second connecting portion and the sign support member in the operative position.

4. The system for mounting a sign support member to an existing, elongate first member according to claim 1 including means on the sleeve for abutting to each of the sign support member and elongate first member to consistently maintain each of a) the first connecting portion and the existing, elongate first member and b) the second connecting portion and the sign support member in the operative position.

5. The system for mounting a sign support member to an existing, elongate first member according to claim 1 wherein the first and second connecting portions each comprise a cup-shaped receptacle to accept free ends of a sign support member and the existing elongate first member.

6. The apparatus for mounting a sign support member to an existing, elongate first member according to claim 5 wherein the sleeve has at least one wall defining oppositely facing first and second surfaces bounding the cup-shaped receptacles on the first and second connecting portions, said first surface abutting the free end of the existing elongate first member in its operative position and said second surface abutting the free end of the sign support member in its operative position so that the sleeve is consistently located relative to the sign support member and the existing elongate first member.

7. The system for mounting a sign support member to an existing, elongate first member according to claim 1 wherein the sign support member is made from at least one of wood, plastic, and metal.

8. The system for mounting a sign support member to an existing, elongate first member according to claim 1 in combination with the existing elongate first member, said existing elongate first member being made from at least one of wood, plastic, and metal.

9. The system for mounting a sign support member to an existing, elongate first member according to claim 2 wherein the means for releasably mounting at least one of a) the first connecting portion and the existing elongate first member and b) the second connecting portion and a sign support member in the operative position comprises at least one of a screw, a bolt, and adhesive.

10. The system for mounting a sign support member to an existing, elongate first member according to claim 1 in combination with the existing elongate first member, said existing elongate first member extending vertically and being a least partially embedded in the ground beneath where a sign to be displayed on the sign support is mounted.

11. The system for mounting a sign support member to an existing, elongate first member according to claim 10 wherein the existing elongate first member and sign support member comprise a single piece that was severed to define said elongate first member and sign support member.

12. The system for mounting a sign support member to an existing, elongate first member according to claim 1 wherein the sleeve comprises first and second separable parts.

13. The system for mounting a sign support member to an existing, elongate first member according to claim 10 in combination with a highway sign on the sign support member.

14. A system for mounting a highway sign support member to an existing, elongate first member, said system comprising:
   a sleeve defining first and second connecting portions,
   said first connecting portion including means for directly engaging the first connecting portion with the existing elongate first member so that the sleeve and existing, elongate first member are stably maintained in an operative position; and
   an elongate sign support member,
   said second connecting portion including means for directly engaging the second connecting portion with the sign support member so that the sleeve and sign support member are stably maintained in an operative position.

15. A method of mounting a sign support member in an operative position, said method comprising the steps of:
providing a rigidly supported, elongate first member;
providing a sign support member;
providing a sleeve defining first and second connecting portions;
engaging the first connecting portion of the sleeve directly with the first member in an operative position so that the first connecting portion of the sleeve and first member are stably connected; and
engaging the second connecting portion of the sleeve directly with the sign support member in an operative position so that the second connecting portion of the sleeve and sign support member are stably connected.

16. The method of mounting a sign support member to an existing elongate, first member according to claim 15 including the step of bolting the sleeve to at least one of the first member and sign support member.

17. The method of mounting a sign support member to an existing elongate, first member according to claim 15 wherein the step of providing the first member comprising the step of providing a first member that is buried in the ground and wherein the step of engaging the first connecting portion comprises the steps of clearing a space around a free end of the first member and sliding the first connecting portion over the free end of the first member.

18. The method of mounting a sign support member to an existing elongate, first member according to claim 15 wherein the step of providing the first member comprises the step of providing a first member that is buried in the ground and wherein the step of engaging the first connecting portion comprises the step of driving the first connecting part into the ground and over a free end of the first member.

19. The method of mounting a sign support member to an existing elongate, first member according to claim 15 wherein the first member comprises a member that is embedded in the ground and including the step of trimming an exposed free end of the first member before engaging the first connecting portion and the first member.

20. The method of mounting a sign support member to an existing elongate, first member according to claim 15 wherein the sleeve comprises first and second joinable parts and including the step of joining the first and second sleeve parts to captively engage at least one of a) the first connecting portion of the sleeve and the first member and b) the second connecting portion of the sleeve and the sign support member.

21. The method of mounting a sign support member to an existing elongate, first member according to claim 15 wherein the sleeve has a dividing wall with oppositely facing surfaces and the step of engaging the first connecting portion of the sleeve comprises the step of abutting a free end of the first member to one of the oppositely facing surfaces in the dividing wail.

22. The method of mounting a sign support member to an existing elongate, first member according to claim 21 wherein the step of engaging the second connecting portion of the sleeve comprises the step of abutting a free end of the sign support member to the other of the oppositely facing surfaces on the dividing wall.

23. The method of mounting a sign support member according to claim 15 further including the step of mounting a sign with a message thereon in an operative position on the sign support member.

24. The system for mounting a sign support member according to claim 1 wherein the sign support member comprises an elongate arm on a railroad crossing signal.

25. The system for mounting a sign support member according to claim 1 including means for weakening the sleeve to facilitate fracture of the sleeve under a predetermined force at a predetermined location.

26. A system for mounting a sign support member to an existing first member, said system comprising:
a sign support member; and
a sleeve defining first and second connecting portions,
said first connecting portion including means for directly engaging the first connecting portion with an existing first member one at least partially within the other in an operative position so that the sleeve is stably supported on the existing first member,
said second connecting portion including means for directly engaging the second connecting portion with the sign support member one at least partially within the other so that the means for directly engaging the second connecting portion with the sign support member stably supports the sign support member in a predetermined position.

27. The system for mounting a sign support member to an existing first member according to claim 26 wherein the sign support member has a length and a non-circular cross section taken transversely to the length of the sign support member.

* * * * *

UNITED STATES PATENT AND TRADEMARK OFFICE
CERTIFICATE OF CORRECTION

PATENT NO. : 5,425,593
DATED : June 20, 1995
INVENTOR(S) : Richard J. Buehler

It is certified that error appears in the above-indentified patent and that said Letters Patent is hereby corrected as shown below:

Col. 5, lines 55, 57, 62, 63, 64 and 65, "wail" should be --wall--.

Col. 10, line 10 "wail" should be --wall--.

Signed and Sealed this

Fourth Day of November, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,425,593
DATED : June 20, 1995
INVENTOR(S) : Richard J. Buehler

It is certified that error appears in the above-indentified patent and that said Letters Patent is hereby corrected as shown below:

Col. 7, line 45 "token" should be "broken"

Signed and Sealed this

Thirtieth Day of December, 1997

Attest:

BRUCE LEHMAN

*Attesting Officer*   *Commissioner of Patents and Trademarks*